United States Patent [19]

Hill et al.

[11] 4,233,152
[45] Nov. 11, 1980

[54] APPARATUS AND METHOD FOR THE TREATMENT OF LIQUORS

[75] Inventors: Robert C. Hill, Santa Clara; Niel E. Nielson, Mountain View; Ronald L. Kreiling, Danville; Ralph A. Nice, Burlingame, all of Calif.

[73] Assignee: Atlantic Richfield Company, Los Angeles, Calif.

[21] Appl. No.: 21,430

[22] Filed: Mar. 19, 1979

[51] Int. Cl.² .............................................. C02B 3/08
[52] U.S. Cl. .................................. 210/703; 210/63 Z; 210/97; 210/221 P; 210/252; 210/764; 210/760; 210/708
[58] Field of Search .................... 210/44, 60, 63 Z, 64, 210/97, 195.1, 218, 220, 221 R, 221 P, 252, 258; 422/24, 28

[56] References Cited

U.S. PATENT DOCUMENTS

| | | | |
|---|---|---|---|
| 3,642,617 | 2/1972 | Brink et al. | 210/44 |
| 3,977,970 | 8/1976 | Willis et al. | 210/44 |
| 4,053,399 | 10/1977 | Donnelly | 210/221 P |
| 4,071,447 | 1/1978 | Ramirez | 210/44 |
| 4,156,648 | 5/1979 | Kuepper | 210/44 |

FOREIGN PATENT DOCUMENTS 51-99848  3/1976  Japan ...................................... 210/63 Z

OTHER PUBLICATIONS

"Ozone Disinfection of Industrial-Municipal Secondary Effluents," Nebel et al., Journal WPCF, Dec. 1973, pp. 2493–2507.

"Get Ready for Ozone," Rosen et al., Water and Waste Engineering, Jul. 1974, pp. 25–31.

"Mechanical Foam Breaker-Means for Foam Control in Wastewater Treatments," Gutierrez, Journal WPCF, Nov. 1977, 2310–2317.

"Toxicity Removed by Foam Separation," Gutierrez, Industrial Wastes, Sep./Oct. 1978, pp. 36–41.

Primary Examiner—Ernest G. Therkorn
Attorney, Agent, or Firm—Flehr, Hohbach, Test, Albritton & Herbert

[57] ABSTRACT

Apparatus and method for treating liquor (e.g., liquor produced by sewage disposal systems) that is contaminated with dissolved, colloidal and finely divided suspended solids, and also with bacteria and viruses. The apparatus maintains a vertical column of the liquor in a treatment tank. Liquor is continuously introduced into the lower portion of the tank and continuously removed at a level well below the top of the tank. The column is continuously sparged with gas containing ozone whereby gas bubbles progress upwardly to the surface with formation of foam that is received in a confined space above the column. The evolving foam is delivered into the zone of operation of an impeller which collapses the foam bubbles by mechanical shearing and impacting. Liquor derived from the collapsed foam and the evolved gas is collected and discharged. Remaining uncollapsed foam is recycled into the shearing zone. Solids of the liquor are removed from the column with the foam and are discharged in the liquor collected from the foam. Also a system and method making use of a plurality of such apparatus units and which treats the liquor in successive stages.

18 Claims, 3 Drawing Figures

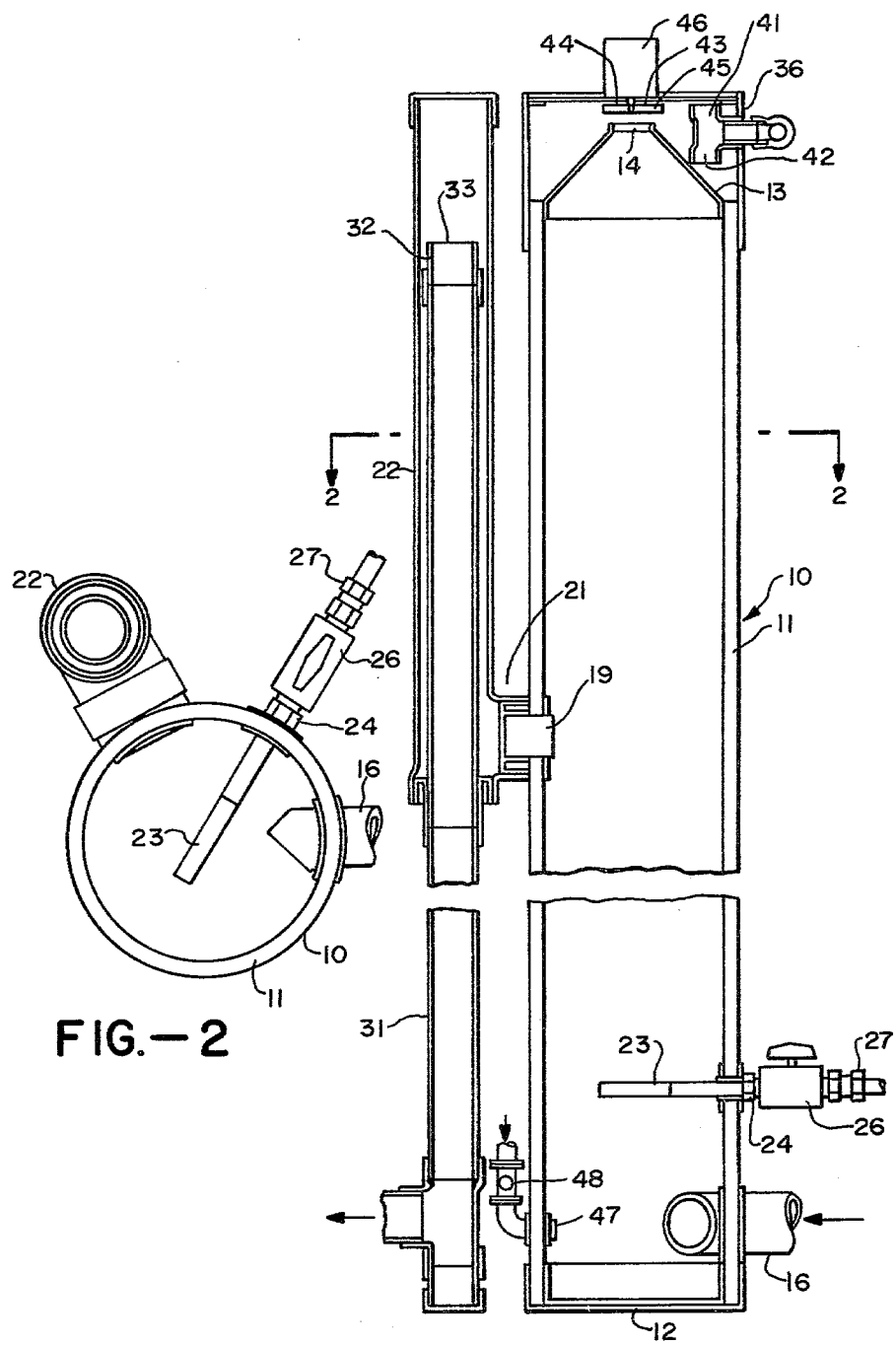

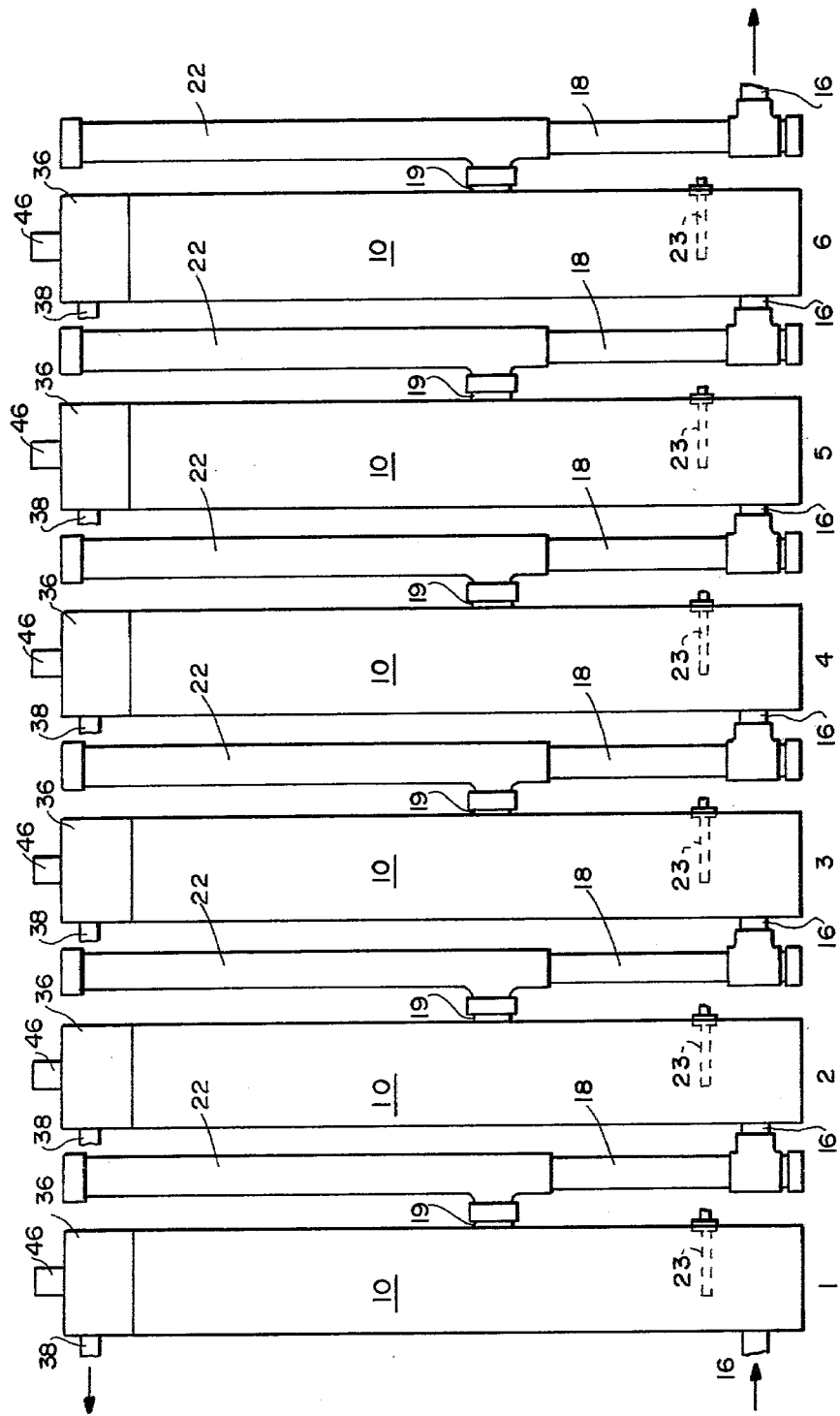
FIG.—3

APPARATUS AND METHOD FOR THE TREATMENT OF LIQUORS

This invention relates generally to liquor treatment apparatus and method for the clarification and ozonation of liquors.

Various waste liquors contain small amounts of contaminants in the form of dissolved and colloidal solids. Also they may contain bacteria and viruses derived from processing operations and the source material from which the liquor was derived. A particular example is effluent derived from sewage treatment systems. Tertiary treatment for such liquor has employed contact with air and oxygen containing ozone. Ozone acts as a highly oxidizing agent to destroy bacteria and viruses and also reacts with certain dissolved or colloidal solids. The apparatus and methods proposed for such treatment have not been entirely satisfactory for a variety of reasons, including inefficiency in the use of ozone, inefficiency or failure to effect the desired removal of solids and the destruction of bacteria and viruses, lack of effective control to maintain desired performance standards and inability to efficiently collect and remove foam which is evolved from the liquor undergoing treatment.

In the treatment of waste liquors derived from sewage treatment systems, it has been common to effect disinfection and chemical oxidation by chlorination. However, if chlorination is carried out to an extent sufficient to effect the desired reactions, certain solids present may be combined with chlorine to produce toxic byproducts. Removal of such toxic byproducts requires added treatment, such as filtration making use of activated charcoal filtration medium, which adds to the overall expense of the process.

It is an object of the present invention to provide a contactor apparatus and method which is effective in the destruction of bacteria and viruses.

Another object is to provide an apparatus and method which is effective in the reduction of BOD and COD to very low levels.

Another object is to provide an apparatus and method which is effective in the oxidation of chemical substances in waste liquors which are resistant to bioxidation or oxidative reaction with halogens.

Another object is to provide an apparatus and method which eliminates or minimizes production of toxic byproducts as a result of oxidation of chemical contaminants. This is accomplished without the production of other byproducts which may be equally or more toxic.

Another object is to effect efficient removal of dissolved solids and also the physical removal of colloidal and other small-sized suspended solids.

Another object is to reduce concentration of surface charge bearing and surface active suspended and dissolved solids in the liquor.

In general, the apparatus consists of an elongated vertical tank serving to form a treatment column, the tank having outflow piping connected to its lower portion and an inflow piping also connected to the lower portion of the tank, and having one of these connections near the pipe bottom and the other located a specified distance from the top of the tank. The inflow piping is formed to introduce liquor into the tank tangentially, thereby causing swirling movement of the column of liquor within the tank. Means is provided for introducing air containing ozone into the tank near the bottom thereof at a level between the outflow and inflow connections. Also means is provided for introducing the liquor to be treated into the inflow piping at head sufficient to cause flow through the tank and to maintain the surface of the liquid in the tank at a substantially constant desired level. Foam collecting means is located at the upper end of the tank, and mechanical defoaming means is provided for shearing and impacting the foam to collapse the foam bubbles. Also means is provided for collecting and removing the liquor derived from the collapsed bubbles and for discharge of air from the collapsed bubbles. Several units of such contactors are connected in series, whereby clarification and ozonation take place progressively. The invention also consists of a method for treating liquors with gas containing ozone making use of the above described apparatus. The method is characterized by certain control factors which make for efficient removal of contaminants, efficient destruction of foam emanating from the liquid within each of the contactors, and overall economical operation.

Additional objects and features of the invention will appear from the following description in which the preferred embodiments have been set forth in detail in conjunction with the accompanying drawing.

Referring to the drawing:

FIG. 1 is a side elevational view in section illustrating apparatus in accordance with the present invention.

FIG. 2 is a cross-sectional view taken along the line 2—2 of FIG. 1.

FIG. 3 is a side elevational view schematically illustrating how a plurality of contactors as shown in FIGS. 1 and 2 are employed in a system.

Referring to FIGS. 1 and 2, the apparatus consists of a cylindrical tank 10 which is disposed vertically and preferably made of relatively light material which is not subject to corrosion. We prefer to use tanks made of plastic material, having inner and outer plastic walls separated by corrugated filler 11. The lower end of the tank is closed by wall 12, and the upper end is provided with an inverted cone 13. The cone has an opening 14 concentric with the axis of the tank. The dimensions and materials of construction of the tank may vary with different liquors and capacities desired. By way of example, the height of the tank, including the cone 13, may be of the order of thirteen feet, and the inner diameter about fifteen inches.

In the illustrated embodiment, the lower portion of the tank connects with inflow piping 16. At a higher level, outflow piping 19 connects with the interior of the tank through fitting 21 with the exterior standpipe 22. The pipe section 16 is preferably bent and serves to introduce liquor tangentially into the tank, thus causing the column of liquor to swirl about the central axis.

Intermediate the inflow and outflow connections, there is an injection nozzle 23 for sparging air together with ozone into the liquor. This nozzle is removably positioned within a fitting 24 which is fixed to the wall of the tank, and which may include a valve 26 which is closed to seal the fitting 24 when the nozzle is removed. Normally the valve 26 is in open position to provide a through passage to accommodate the nozzle, and the fitting is sealed with respect to the nozzle by the packing gland 27. Suitable metering means is used for introducing air containing ozone from a source under pressure to nozzle 23 at a constant desired rate.

Within the standpipe 22 there is a pipe 31 which carries an adjustable extension 32 at its upper end which forms an adjustable weir 33 over which liquor flows from the standpipe 22 into pipe 31 and from thence into the inflow piping 16 of the next following contactor tank. A bushing 34 forms a seal between the tube 31 and the body of the fitting 19.

A shell or housing 36 is seated upon the upper end of the tank and forms an annular collection chamber that surrounds the cone 13. A discharge pipe 38 connects with the chamber 37 and within the chamber it is provided with a tee 39 which provides one upwardly faced opening 41 for the removal of gas, and a lower downwardly faced opening 42 for the removal of liquid resulting from the collapsing of foam. Above the opening 14 of the cone there is an impeller 43 which is preferably in the form of a disk 44 carrying the radially extending paddle-like vanes 45. This impeller is secured to the vertical shaft of an electric motor 46. It is rotated at speeds sufficient to cause bubbles accelerated by the vanes 45 to be effectively collapsed by shearing and impacting, as for example, a speed of the order of 1700 r.p.m. Additional bubble collapsing occurs as the discharge from the impeller impinges at high velocity upon the side walls of the housing 36. It should be understood that other impeller forms may be employed which are effective to collapse the foam bubbles.

Operation of the apparatus described above, and the method involved are as follows. When in operation, the tank is filled with liquor to a level determined by the level of the weir 33 and the rate of airflow into the tank. When the weir is located as shown in FIG. 1, the upper liquor level within the tank is near the top of the tank. A substantially constant inflow of liquor is maintained into the lower end of the tank 10. Air under pressure is continuously sparged into the liquor within the tank, the air containing a small content of ozone, as for example, from 1 to 2%. Flow to the nozzle 23 is metered and maintained substantially constant. Treated liquor flows continuously through the outlet piping 19 with back pressure being controlled by the downstream weir 33 to maintain the desired column height within the tank. In a system such as will be presently described, inflow piping 16 connects with the lower end of tank 10 of the next preceding contactor apparatus of a series, through a suitable fitting. In certain instances a return connection may be provided from pipe 31 for the purpose of recycling a portion of the effluent back to the tank from which it has been withdrawn. Such returned liquor can be introduced into the tank substantially at the same height as the normal inlet 16 of that tank (e.g., by way of pipe 47). Flow restricting means 48, such as a valve or orifice in the return connection, may be employed to regulate the recycle flow. The function of such recycle is to enhance internal mixing and to minimize any tendency toward unmixed discharges (channeling), especially in applications characterized by low flow rates and extended treatment.

Flow of liquor into the tank through the tangentially directed piping 16 causes swirling movement of the column of liquor. Gas introduced by the nozzle 23 is sparged into the liquor whereby rising and expanding bubbles of the gas are formed, and such bubbles are distributed uniformly over the entire cross-sectional area of the tank between the inflow piping 16 and the top of the tank. This uniform distribution of the rising air bubbles carrying ozone makes for efficient contact of the gas with the liquor and the solids carried by the liquor. The inflow rate of liquor into the tank and the introduction of gas containing ozone is so regulated that gas emanating from the surface of the liquid column consists primarily of air with a minimum amount of ozone. In other words, the major portion of the ozone is reacted or remains in solution in the liquor. The zone extending between the inflow piping 16 and the outflow piping 19 is characterized by intimate mixing of rising bubbles and liquor. The zone extending from the outflow fitting 19 to the upper level of the liquor is characterized by rising and expanding bubbles of gas that are substantially evenly distributed over the entire cross-sectional area of the tank, and also by relatively quiescent conditions in the body of liquor, such conditions serving to promote stratification and concentration of contaminants near the upper surface of the liquor column. Such concentration increases reaction rates with ozone, thereby increasing ozone utilization efficiency. A substantial amount of foam is generated by virtue of aeration and the presence of foam forming substances in the liquor, having reference to both such substances in the influent liquor and those created in the tank by reaction of ozone with otherwise non-surface active substances that are also present. Such foam passes upwardly through the cone 13 and the opening 14, which is of a diameter relatively small compared to the inner diameter of the tank (e.g., 4 inches for a 15 inch tank). After passing through the opening 14 of the cone 13, the foam is drawn into the zone of operation of the impeller 43, whereby it is accelerated and impacted by the vanes 45 to collapse the bubbles. The largely defoamed material then falls into the collecting chamber 37, and the liquid content discharges through the opening 42. Gas that is liberated by collapsing the foam bubbles passes out of the chamber 39 through the opening 41. Any foam delivered into the chamber 49 cannot discharge through either opening 39 or 41 but tends to make its way upwardly over the surface of the cone 13, thus causing it to be recycled into the zone of operation of the impeller 43. Upward movement of the foam both from within the cone 13 and over the exterior surface of the same is induced by swirling movement of air within the upper part of the chamber 37.

With respect to the tangential introduction of liquor through piping 16, the swirling movement thereby imparted to the liquor column is insufficient to develop a vortex or substantial centrifugal separating forces. It is sufficient however to effect improved lateral distribution of the gas bubbles and a longer retention time of the bubbles within the liquor, which makes for more efficient reaction. The angular velocity of the swirling movement decreases toward the upper surface of the column and does not disturb the upper quiescent zone in which contaminants are concentrated.

In general, the apparatus and method described above make for efficient removal of solid contaminants and sterilization with respect to destruction of bacteria and viruses. The height of the liquor column within the treatment tank, which can be controlled by adjusting the weir 33, together with the presence of a quiescent zone for contaminant concentration, and controlling the amount of ozone and air introduced by way of the nozzle 23, makes possible such efficient operation, and economical utilization of ozone. This means and the method for handling the foam emanating from the top of the liquor column avoids recycling of suspended and concentrated dissolved solids back into the liquor column, and effectively removes the solids carried with the foam while removing a minimum amount of liquor. Colloidal and very fine suspended solids are removed with the foam. Also there is a reduction in concentration of surface charge bearing and surface active dissolved and suspended solids of the liquor, since such dissolved solids become concentrated in the liquor of the foam. By proper adjustment of the weir 33 and the rate of injection of air and ozone, the retention time for the foam bubbles between separation from the surface of the liquor column and their destruction by impeller 43 can be adjusted to be shorter or longer. Effective control of the drainage of interstitial liquid in the foam fractionation process serves to minimize loss of bulk liquor and maximize concentration of contaminants in the foam.

FIG. 3 illustrates a contactor system making use of a plurality of units of equipment constructed as shown in FIGS. 1 and 2. The units in this instance are numbered 1–6. The first unit 1 receives liquor at a regulated rate of flow introduced into piping 16, and the liquor discharged from the lower portion of the tank is delivered into the standpipe 22 and over the weir into pipe 31 and from thence through piping 16 of the next downstream tank. Air lift pumping created by the injection of gas through diffuser 23 causes the liquor level in the inlet standpipe 31 of a tank to be lower than the level in the annular portion of the outlet standpipe 22 at each stage, thereby providing independent head control of each tank by means of the weirs 33 and their adjustment. As liquor being treated progresses from one unit to the next, the amount of contaminants is progressively reduced, and the amount of air containing ozone introduced into the units is progressively reduced from the first to the last unit. In addition, the liquid level in each of the tanks is progressively controlled whereby in the first unit where the concentration of contaminants is greatest, the liquid level can be adjusted commensurate with the amount of foam that will be evolved and the height of the foam column for effective liquor drainage back into the tank. For the remaining units of the series, the level of the liquid in each tank is progressively higher, whereby it is highest for the last unit where the concentration of contaminants in the liquor is lowest, the rate of foam generation is lowest, and the foam lifetime is shortest. By utilizing such level control means, foam retention times of from one second to more than one minute can be achieved. Short retention times are a significant factor in achieving extremely low residual contaminant levels in the final effluent.

The invention is well adapted for use with a sewage disposal system of the fixed bacteria film type as disclosed in our application filed simultaneously herewith. The effluent from such a system may be treated with chemicals such as chlorine and filtered before being supplied to a system as shown in FIG. 3. Care is taken to control the extent of chemical treatment to avoid formation of the previously mentioned toxic by-products. In addition to the chemical treatment and filtration treatment before supplying liquor to the first contactor unit, some additional chemicals (e.g., chlorine) may be added to the liquor flowing between units. For example, chlorine can be metered into the outflow piping from the first unit, with use of mixing means to effect distribution of the chlorine before the liquor is supplied to the second unit. Reaction of such chemicals with the liquor and removal of any residual quantities by air and ozone gas stripping in subsequent units effectively presents carryover into the final effluent (e.g., dechlorination).

Examples of the invention are as follows:

EXAMPLE 1

Considering treatment of liquor in a series of six units as in FIG. 3, each unit being made as shown in FIGS. 1 and 2, each tank was about 13 feet high from the bottom to the top of the cone 13 and the diameter was 15 inches. The inlet piping 16 was connected close to the bottom of each tank and the nozzle 23 was located about 18 inches from the bottom. The outflow 19 was located about 8 feet, 9 inches from the bottom of the tank. The weir 33 of the first tank was adjusted to maintain a level of liquid in the tank about 12 inches from the top of the cone. Subsequent weirs were adjusted to provide progressively increasing liquor levels, with the level in tank 6 being about 6 inches from the top of the cone. The liquor supplied to the unit was derived from a sewage disposal system of the type disclosed in our copending application filed simultaneously herewith, and had been chlorinated but not filtered. It contained typically about 30 ppm solids suspended and about 30 ppm BOD. This liquor was supplied to the first unit at a flow rate of about 5 gallons per minute, and after treatment was removed through the outflow piping of unit No. 6 at a slightly slower rate. Air containing 1% ozone, from a source under pressure of about 7 p.s.i., was supplied through metering means to each nozzle 23. Each nozzle sparged this gas into the corresponding column of liquor. The gas sparged into each liquid column formed bubbles which were distributed over the cross-sectional area of each column. As the operation proceeded, the foam generated was collected in each cone 13, and after a cone was filled the foam discharged upwardly through the opening 14, which was about 4 inches in diameter. The foam was drawn into the zone of operation of the impeller 43 whereby the bubbles were collapsed by the action of the vanes 45. The liquid formed by collapsing of the bubbles collected in each chamber 37 and eventually a liquid level was reached such that liquid flowed out through the piping 38. Gas released by collapse of the bubbles also passed out of the chamber 37 through the opening 41. Some uncollapsed foam tended to collect in the chamber 37. By virtue of swirling movement of air within this chamber above the liquid, such foam was caused to move upwardly over the exterior surfaces of the cone and to be propelled back into the zone of operation of the impeller. Analysis of the liquor discharging from tank 6 revealed that both suspended solids and BOD had been reduced to typically less than 10 ppm. Also it was found that coliform bacteria had been reduced from typically greater than $1 \times 10^7/100$ ml to typically less than 2/100 ml. From other tests it was determined that the addition of a sand filtration stage upstream of the tank would reduce each of the last mentioned figures by a factor of at least 3:1.

What is claimed is:

1. A contactor for treating liquors with gas containing ozone for removing contaminating solids and the destruction of bacteria and viruses, the gas being supplied from a source of the same, the contactor comprising an elongated vertical tank, inflow piping connected to the lower portion of the tank, outflow piping connected to an intermediate portion of the tank and spaced upwardly from the inflow piping, means connected to said source for introducing said gas containing ozone into the tank at a level between the inflow and outflow connections, means for maintaining a quiescent zone of liquor and a desired liquor level in the upper portion of the tank, means at the upper end of the tank for receiving and mechanically shearing and impacting foam discharging from the tank to collapse the foam bubbles, and means for collecting and removing the liquor of the collapsed bubbles and for the discharge of gas evolved from the same, said means for maintaining a desired level of liquor in the tank consisting of a vertical standpipe having its lower end connected to receive liquor from the outflow piping.

2. A contactor as in claim 1 in which an overflow weir is disposed within the standpipe, the weir and the standpipe serving to maintain a desired liquid level in the tank.

3. Contacting apparatus as in claim 2 in which the weir is vertically adjustable.

4. Contacting apparatus as in claim 1 in which the tank is cylindrical and a cone is fixed to its upper end, the cone having an opening at its upper smaller end which is aligned with the axis of the tank, a rotary foam shearing and impacting impeller disposed above said opening, means forming a collecting chamber surrounding the impeller and the cone and serving to collect liquid derived from collapsed foam, and outlet means for effecting discharge of collected liquid from said chamber and for the discharge of gas from the chamber.

5. Contacting apparatus as in claim 1 in which the inflow piping is formed to introduce the liquor tangentially into the tank.

6. Contacting apparatus as in claim 1 in which a quiescent zone is maintained upwardly from the outflow piping.

7. A method as in claim 6 in which the steps are repeated in successive stages and tanks, with each stage receiving treated liquor from the preceding stage.

8. A method as in claim 7 in which the surface level of liquor in the tanks is such that the level in the tank in the first stage is lowest and the level of liquor in the last stage is highest, the level of intervening stages being progressively higher than in the first stage.

9. Contacting apparatus as in claim 1 in which piping and flow control means is provided for recycling a portion of the outflow to the inflow region of the tank.

10. A method of treating liquors with gas for removing contaminating solids and the destruction of bacteria and viruses, the method making use of an elongated vertical treatment tank together with a vertical standpipe exterior of the tank, the steps of maintaining a column of liquor in the tank by continuously introducing liquor to be treated into the lower portions of the tank and continuously removing liquor from an intermediate portion of the tank, continuously sparging the liquor column by introduction of air containing ozone at a level above the level at which the liquor is introduced and below the level at which the liquor is removed, the sparging of gas into the column causing bubbles to progress upwardly through the column with gradual expansion and also causing formation of foam above the surface of the liquor, causing a portion of the liquor column located upwardly from the outlet to be maintained quiescent to thereby cause contaminants to be concentrated in the upper part of the column, causing the foam to be collected and delivered upwardly into a defoaming zone, mechanically shearing the foam in said defoaming zone to collapse the bubbles of the same and collecting and discharging the liquor resulting from collapsing of the foam and the gas thereby released, and maintaining a desired liquid level in the tank by introducing liquid being removed from the tank into the lower end of the standpipe.

11. A method as in claim 10 in which the retention time between movement of the foam from the surface of the liquor and mechanical shearing and impacting of the same is adjusted to a predetermined value.

12. A method as in claim 10 in which uncollapsed foam after leaving the defoaming zone is recycled back into the defoaming zone.

13. A method as in claim 10 in which a portion of the outflow is recycled into the inflow region of the tank.

14. A method as in claim 10 in which the liquor is introduced into the tank tangentially.

15. A method as in claim 10 in which the rate of introduction of air and ozone into the column is controlled whereby substantially all of the ozone is reacted with components of the liquor before the gas bubbles reach the surface of the column.

16. A method as in claim 10 in which the concentration of contaminating solids is caused to be greatest in the upper portion of the column of liquor adjacent the surface of the same.

17. A system for treating liquors with gas containing ozone for removing contaminating solids and for the destruction of bacteria and viruses, the gas being supplied from a source of the same, said system comprising a series of contactor units each comprising an elongated vertical tank, inflow piping connected to the lower portion of the tank, outflow piping connected to the lower portion of the tank and spaced upwardly from the inflow piping, means for introducing said gas containing ozone from said source into the tank at a level between the inflow and the outflow connections, means for maintaining a desired level of liquor in the tank and a quiescent zone located upwardly of the outflow piping, said means for maintaining a desired level of liquor in the tank consisting of a vertical standpipe having its lower end connected to receive liquor from the outflow piping, means at the upper end of each tank for receiving and mechanically shearing and impacting foam discharged from the tank to collapse the foam bubbles, and means for collecting and removing the liquor of the collapsed bubbles and for the discharge of gas evolved from the same, said contactor units of the system being connected in series whereby liquor introduced into the inflow of the first contactor unit of the series proceeds progressively through the contactor units and is discharged from the last contactor unit of the series, said means for maintaining a desired level of liquor within the tank for each contactor unit being connected to deliver liquor into the inflow of the next contactor unit of the series.

18. A system as in claim 17 in which the means at the upper end of the tank for receiving and mechanically shearing foam consists of a cone on the upper end of the tank, the cone having an opening axially aligned with the tank, and impeller means overlying the opening for mechanically shearing and impacting foam bubbles.

* * * * *